United States Patent
Richard et al.

(10) Patent No.: US 9,291,299 B2
(45) Date of Patent: Mar. 22, 2016

(54) DISPLAY STAND WITH LATCHING MECHANISM

(75) Inventors: Owen Richard, Fort Collins, CO (US); David Quijano, Fort Collins, CO (US); Jonathan D Bassett, Fort Collins, CO (US); Gregory A Standiford, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 151 days.

(21) Appl. No.: 14/235,855

(22) PCT Filed: Aug. 31, 2011

(86) PCT No.: PCT/US2011/049979
§ 371 (c)(1), (2), (4) Date: Jan. 29, 2014

(87) PCT Pub. No.: WO2013/032465
PCT Pub. Date: Mar. 7, 2013

(65) Prior Publication Data
US 2014/0192504 A1    Jul. 10, 2014

(51) Int. Cl.
*H05K 5/00* (2006.01)
*F16M 11/10* (2006.01)
*F16M 11/20* (2006.01)
*F16M 11/24* (2006.01)
*F16H 21/44* (2006.01)

(52) U.S. Cl.
CPC ............. *F16M 11/10* (2013.01); *F16H 21/44* (2013.01); *F16M 11/2092* (2013.01); *F16M 11/24* (2013.01); *H05K 5/0017* (2013.01); *F16M 2200/024* (2013.01); *F16M 2200/044* (2013.01); *F16M 2200/063* (2013.01); *Y10T 74/18856* (2015.01)

(58) Field of Classification Search
CPC ........................................................ H05K 5/00
USPC ......................................................... 361/807
See application file for complete search history.

(56) References Cited

U.S. PATENT DOCUMENTS

| | | | | |
|---|---|---|---|---|
| 6,822,857 B2 * | 11/2004 | Jung | ...................... | F16M 11/10 248/920 |
| 7,124,984 B2 * | 10/2006 | Yokouchi | ............... | F16M 11/24 248/125.8 |
| 7,404,233 B2 * | 7/2008 | Lu | .......................... | F16M 11/04 16/287 |
| 7,472,880 B2 * | 1/2009 | Ogawa | ................... | F16M 11/10 248/455 |

(Continued)

OTHER PUBLICATIONS

International Search Report, Apr. 9, 2012, Korean Intellectual Property Office, PCT Patent Application No. PCT/US2011/049979, Filed Aug. 31, 2011.

*Primary Examiner* — Courtney Smith
*Assistant Examiner* — Rashen E Morrison
(74) *Attorney, Agent, or Firm* — HP Inc. Patent Department

(57) ABSTRACT

Example embodiments disclosed herein relate to a display stand. The display stand includes a base, a support arm, one or more display mounts, and a latching mechanism. A display may be attached to the one or more display mounts. The display may include a variety of devices such a monitor, workstation, or computer. The latching mechanism is configured to have a latched position that secures the support arm and one or more display mounts in a reclined position substantially parallel to the base. The latching mechanism is additionally configured to have an unlatched position that allows extension of the support arm and one or more display mounts.

18 Claims, 7 Drawing Sheets

(56) References Cited

U.S. PATENT DOCUMENTS

| | | | |
|---|---|---|---|
| 7,497,410 B2* | 3/2009 | Lee | F16M 11/04 248/125.8 |
| 7,636,133 B1 | 12/2009 | Hsu | |
| 7,671,934 B2* | 3/2010 | Miyayama | F16M 11/10 349/58 |
| 7,694,919 B2* | 4/2010 | Lee | F16M 11/04 248/123.11 |
| 7,694,929 B2* | 4/2010 | Jang | F16M 11/04 248/372.1 |
| 7,717,384 B2* | 5/2010 | Kim | F16M 11/04 248/284.1 |
| 7,766,296 B2* | 8/2010 | Choi | F16M 11/10 248/176.1 |
| 7,922,133 B2* | 4/2011 | Hsu | F16M 11/10 248/127 |
| 7,967,260 B2* | 6/2011 | Hsu | F16M 11/04 248/133 |
| 7,967,273 B2* | 6/2011 | Zhou | F16M 11/04 248/176.3 |
| 8,070,115 B2* | 12/2011 | Wang | F16M 11/04 248/133 |
| 8,944,396 B2* | 2/2015 | Mau | E05D 3/12 248/274.1 |
| 9,074,721 B2* | 7/2015 | Lau | F16M 13/02 |
| 2005/0002159 A1* | 1/2005 | Jeong | F16M 11/04 361/679.27 |
| 2005/0254204 A1 | 11/2005 | Hwang et al. | |
| 2006/0038104 A1* | 2/2006 | Choi | F16M 11/00 248/370 |
| 2007/0047186 A1* | 3/2007 | Jang | F16M 11/04 361/679.06 |
| 2007/0194183 A1 | 8/2007 | Kim | |
| 2008/0266768 A1 | 10/2008 | Drew | |
| 2009/0166501 A1* | 7/2009 | Wang | F16M 11/04 248/419 |
| 2010/0006730 A1* | 1/2010 | Hsu | F16M 11/04 248/346.06 |
| 2012/0248048 A1* | 10/2012 | Wu | F16M 11/10 211/26 |

* cited by examiner

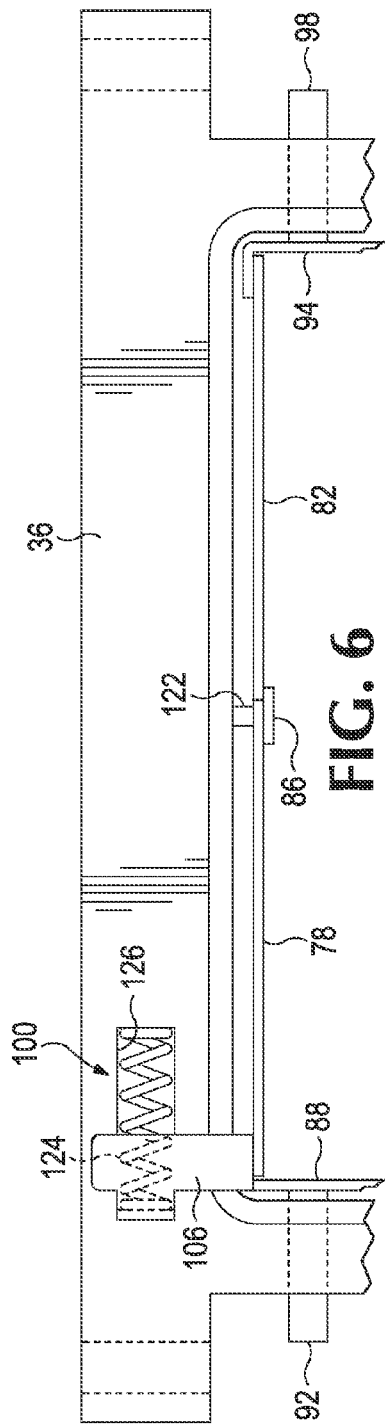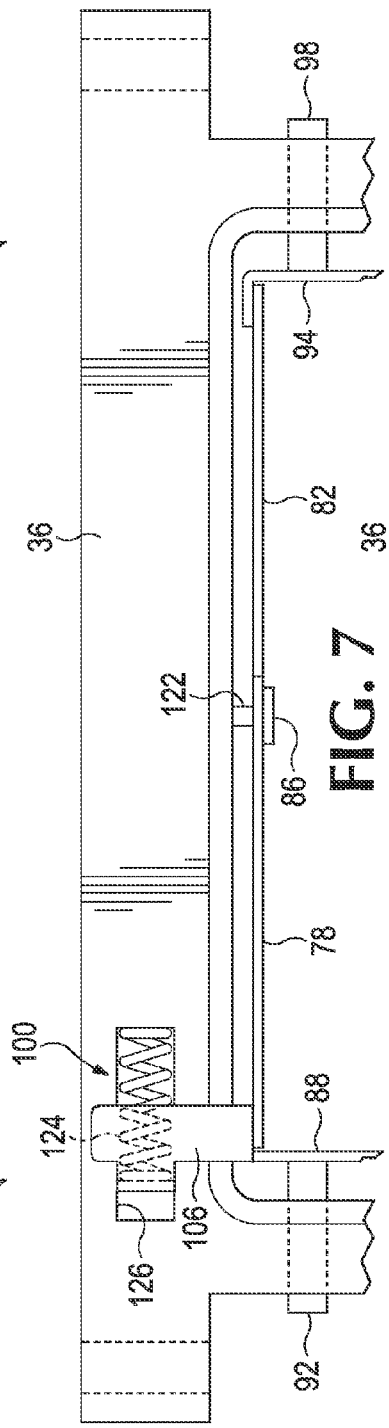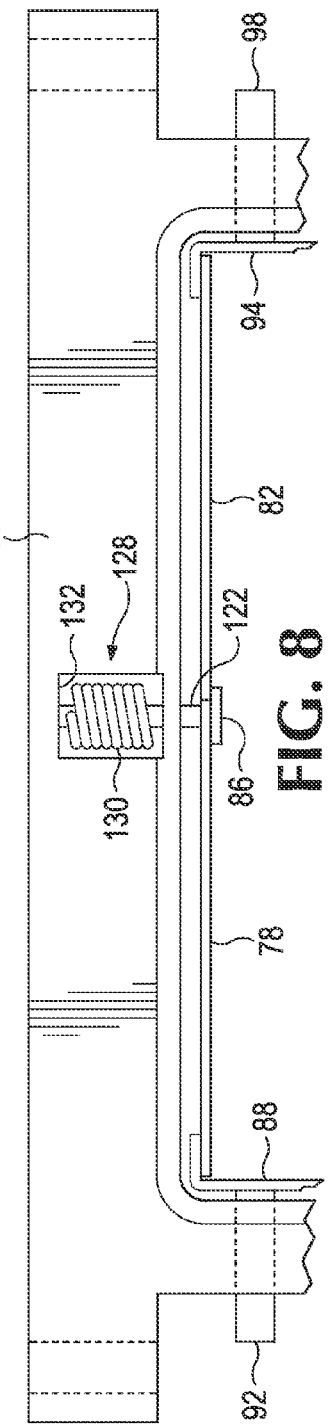

US 9,291,299 B2

DISPLAY STAND WITH LATCHING MECHANISM

BACKGROUND

A challenge exists to design stands for displays that provide useful features to end users. For example, allowing end users to adjust the height and tilt of the stand for ease of viewing of the display. As another example, allowing end users to change the orientation of the display on the stand to be either landscape or portrait. As a further example, allowing end users to attach the stand to the edge of a work surface, rather than resting on it, to minimize the amount of work space utilized by the stand.

BRIEF DESCRIPTION OF THE DRAWINGS

The following detailed description references the drawings, wherein:

FIG. 6 is an example of a biasing assembly and portion of a support arm of a display stand.

FIG. 7 is an example of a spring of the biasing assembly of FIG. 6 in a compressed position.

FIG. 8 is another example of an alternative biasing assembly and portion of a support arm of a display stand.

DETAILED DESCRIPTION

Stands for displays should be designed to provide useful features to meet the various needs of end users. For example, if a display is rigidly fixed to a base or only has limited adjustability, then certain angles of view may not be available to end users. As another example, an end user may need to adjust the position of a display to take care of ambient reflections that distract from or prevent viewing of the display. Thus, display stands should allow end users to adjust the height and tilt of the stand for ease of viewing of the display.

Figure 1:
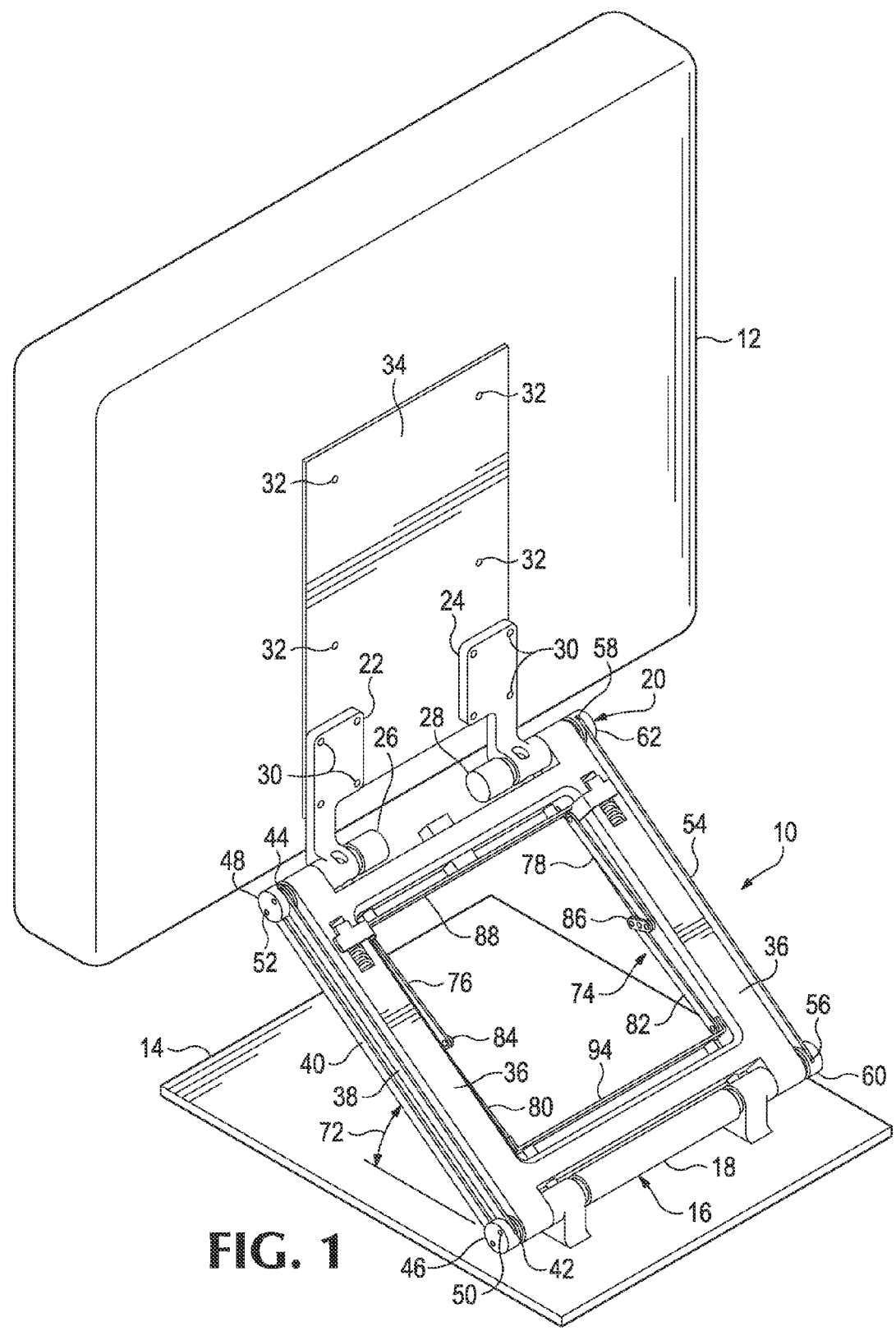
FIG. 1 shows a perspective view of an example of a stand for a display with a display attached.

Other display stand features may be useful to end users as well. For example, FIG. 1 shows a perspective view of an example of a display stand 10 on which a display 12 is attached. Display 12 may include a variety of different devices such as monitors, workstations, computers, and other peripherals. Display stand 10 is illustrated in an extended position that it might typically assume when in use, although other extended positions are possible. Display stand 10 includes a base 14 to which a lower axis 16 is coupled. As can be seen in FIG. 1, lower axis 16 includes a lower hinge 18 described in more detail below. Display stand 10 also includes an upper axis 20 to which display mounts 22 and 24 are coupled. As can also be seen in the example display stand 10 shown in FIG. 1, upper axis 20 includes upper hinges 26 and 28 to which display mounts 22 and 24 are respectively coupled. As can further be seen in FIG. 1, display mounts 22 and 24 are each configured to attach to display 12 via a VESA (Video Electronics Standards Association) type arrangement. More specifically, display mounts 22 and 24 include a plurality of apertures or openings 30 that are designed to align with apertures or openings 32 of plate or bracket 34 attached to display 12. Fasteners (not shown) are disposed in apertures or openings 30 and 32 to attach display 12 to mounts 22 and 24.

A support arm 36 is rotatably coupled to lower hinge 18 of lower axis 16 and upper hinges 26 and 28 of upper axis 20. Support arm 36 includes parallelogram linkages 38 and 40 the ends of which are disposed in slots or cavities 42 and 44 of respective tower hinge linkage receiving portion 46 and upper hinge linkage receiving portion 48. Link fixing shafts 50 and 52 are disposed in openings (not shown) of parallelogram linkages 38 and 40 to secure them to lower hinge linkage receiving portion 46 and upper hinge linkage receiving portion 48. Support arm 36 also includes a pair of parallelogram linkages (only one linkage 54 of which is shown) the ends of which are disposed in slots or cavities 56 and 58 of respective lower hinge linkage receiving portion 60 and upper hinge linkage receiving portion 62. Link fixing shafts (not shown) are disposed in openings (also not shown) of this other pair of parallelogram linkages to secure them to lower hinge linkage receiving portion 60 and upper hinge linkage receiving portion 62.

Figure 2:
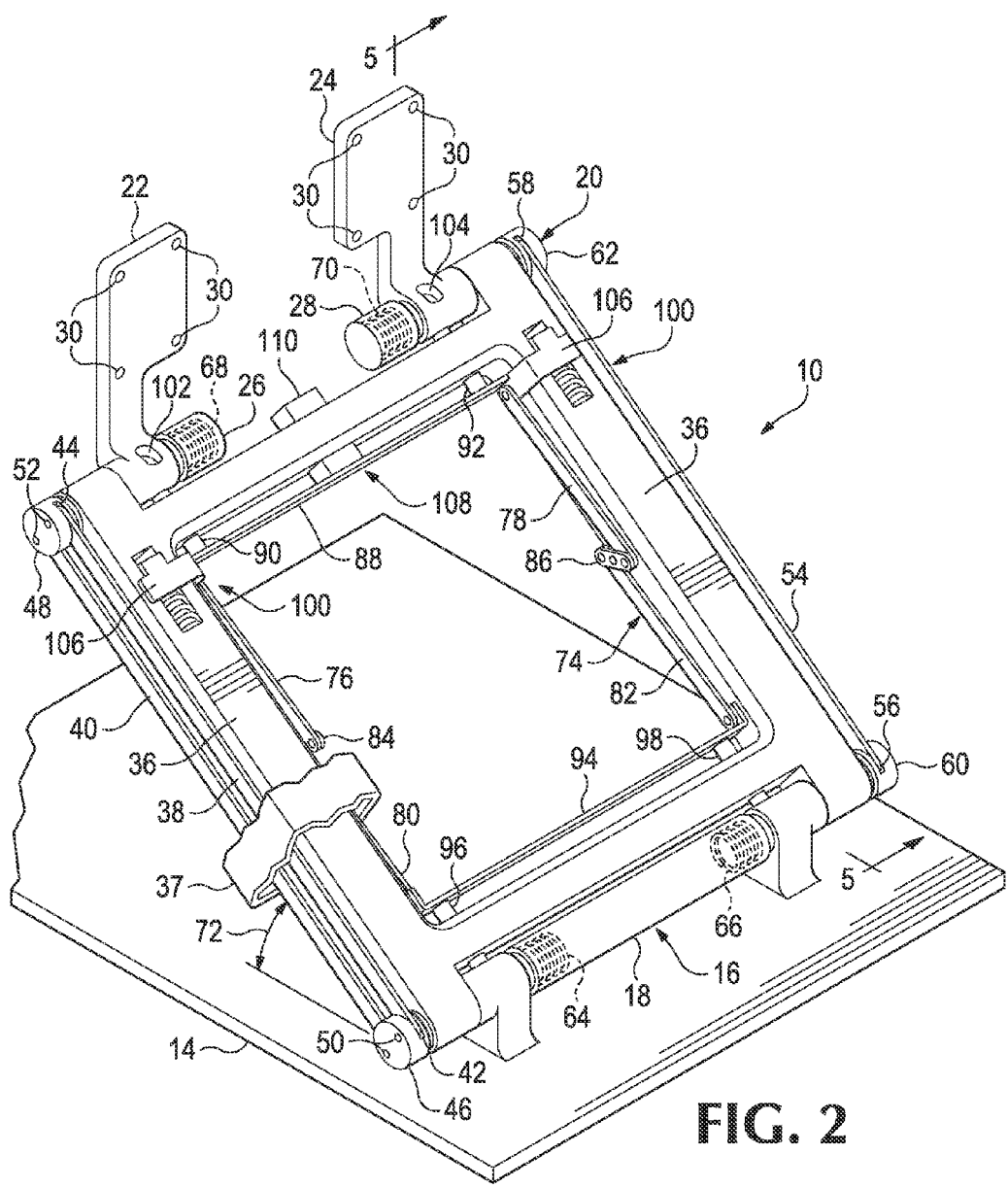
FIG. 2 shows a perspective view of an example of a stand for a display in an extended position.

Referring to FIG. 2, lower hinge 18 includes a pair of torsion springs 64 and 66 that are rotatably coupled to respective lower hinge linkage receiving portions 46 and 60. As can also be seen in FIG. 2, upper hinge 26 includes a torsion spring 68 that is rotatably coupled to upper hinge linkage receiving portion 48 and upper hinge 28 includes a torsion spring 70 that is rotatably coupled to upper hinge linkage receiving portion 62. The arrangement of parallelogram linkages 38, 40 and 54, lower hinge linkage receiving portions 46 and 60, upper hinge linkage receiving portions 48 and 62, and torsion springs 64, 66, 68 and 70 allows support arm. 36 to retain display mounts 22 and 24 (and thus display (2) in substantially the same orientation relative to base 14 as the angle 72 of support arm 36 relative to base 14 changes (either increases or decreases). It also allows the height of display 12 relative to base 14 to be adjusted by an end user, increasing as angle 72 increases and decreasing as angle 72 decreases. In one embodiment of display stand 10, the height of display mounts 22 and 24 (and thus display 12) relative to base 14 is selected to range from zero (0) millimeters to one hundred (100) millimeters as angle 72 of support arm 36 increases, for example, from the reclined position shown in FIG. 3 to the extended position shown in FIGS. 1 and 2.

Figure 3:
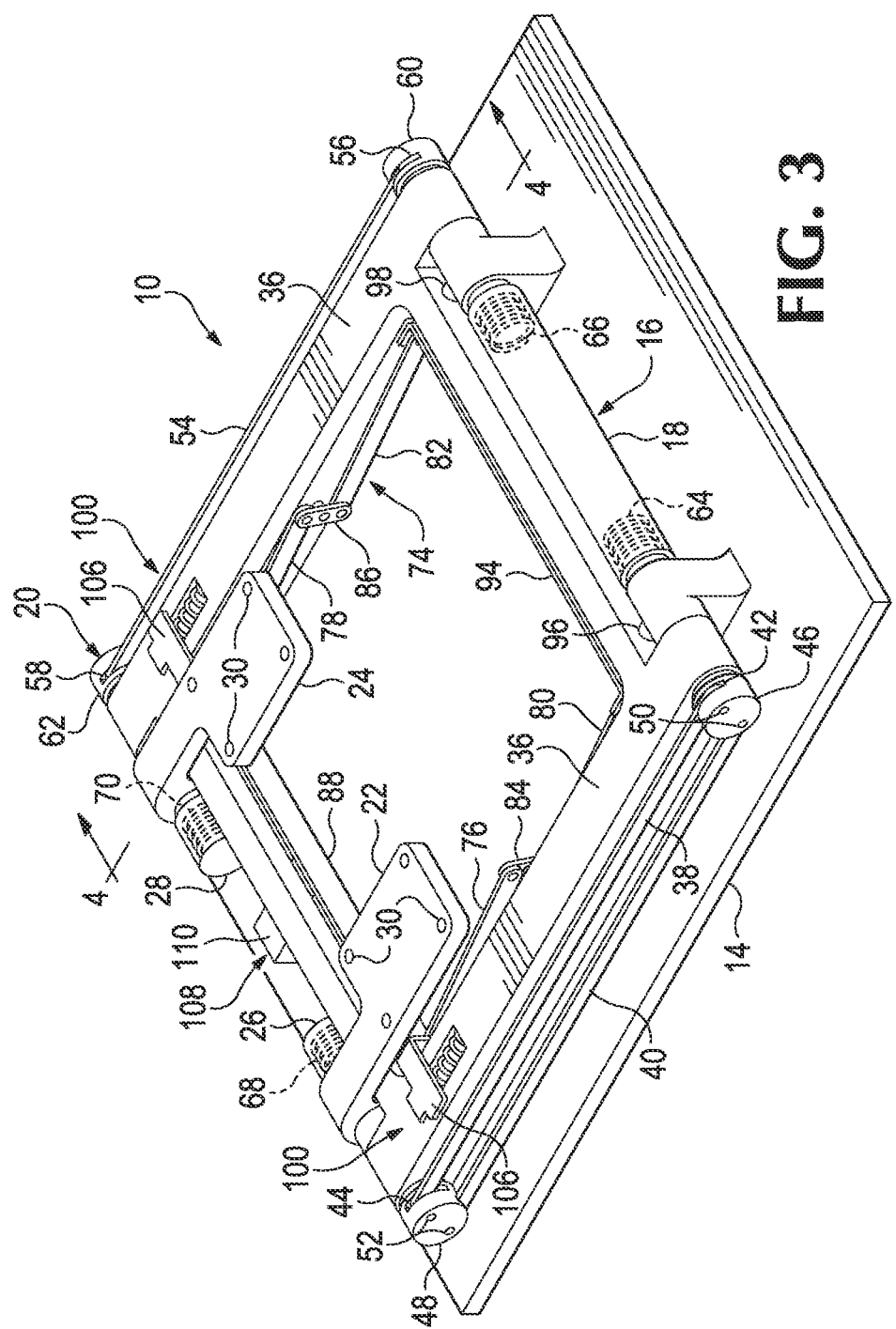
FIG. 3 shows a perspective view of an example of a stand for a display in a reclined position.

Display stand 10 additionally includes a latch mechanism 74 coupled to lower axis 16 and upper axis 20. Latch mechanism 74 is configured to have a latched position that helps retain support arm 36 in a reclined position substantially parallel to base 14, as shown in FIG. 3, and an unlatched position that permits rotation or extension of support arm 36 and adjustment of angle 72 of support arm 36 relative to base 14, as shown in FIGS. 1 and 2. As can also be seen in FIG. 3, the latched position of latch mechanism 74 also helps retain display mounts 22 and 24 in a reclined position substantially parallel to base 14 and the unlatched position permits rotation or extension of display mounts 22 and 24 through a range of positions, including the one shown in FIGS. 1 and 2.

As can be seen in the example of display stand 10 shown FIGS. 1-3, latch mechanism 74 has a reverse motion linkage assembly that includes upper linkages 76 and 78 and lower linkages 80 and 82. Reverse motion linkage assembly additionally includes linkage rocker 84 coupled to upper linkage 76 and lower linkage 80 and linkage rocker 86 coupled to upper linkage 78 and lower linkage 82. As can be seen in FIG. 2, latch mechanism 74 additionally includes an upper linkage bar 88 to which pins 90 and 92 are coupled and a lower linkage bar 94 to which pins 96 and 98 are coupled. A biasing assembly 100 is coupled to upper linkage 78 via tab 106 and is configured to apply a resilient force that disposes upper pins 90 and 92 in respective slots or recesses 102 and 104 of upper hinges 26 and 28 and lower pins 96 and 98 in slots or recesses of lower hinge 18 to secure display stand 10 in the reclined position, as discussed in more detail below in connection with FIG. 4.

Latch mechanism 74 further includes an actuator assembly 108 that is coupled to upper linkage bar 88. Actuator assembly 108 is configured, upon manual actuation via button 110, to oppose the resilient force applied by biasing assembly 100 to remove upper pins 90 and 92 from respective slots 102 and 104 of upper hinges 26 and 28 and lower pins 96 and 98 from the slots of lower hinge 8, thereby unsecuring display stand 10 from the reclined position and allowing it to be rotated or extended through angle 72. As can be seen in FIG. 2, support arm 36 of display stand 10 may be disposed in a housing 37 that covers parallelogram linkages 38, 40 and 54, latch mechanism 74, and biasing assembly 100.

Figure 4:
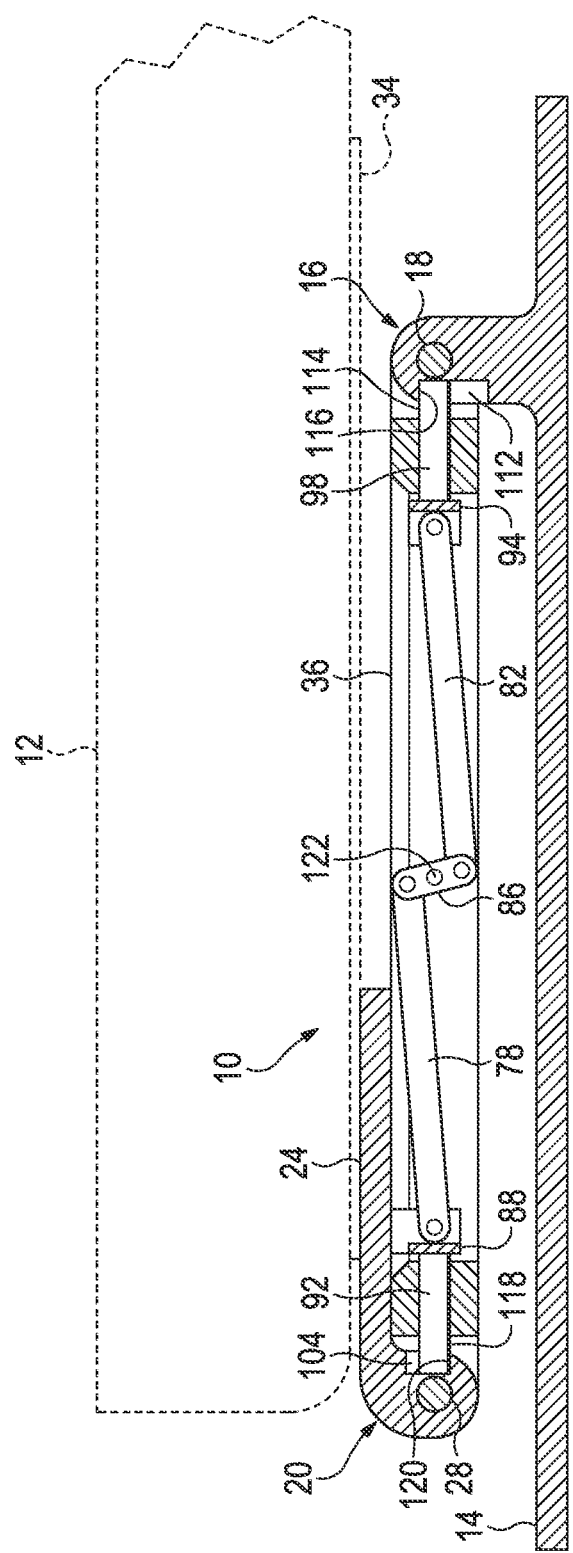
FIG. 4 is a sectional view taken along line 4-4 of FIG. 3.

FIG. 4 is a sectional view of display stand 10 taken along line 4-4 of FIG. 3. An outline of display 12 has been added for illustration. As can be seen in FIG. 4, pin 92 is disposed in slot or recess 104 of upper axis 20 and pin 98 is disposed in slot or recess 112 of lower axis 16 by biasing assembly 100 of latch mechanism 74. This arrangement along with pin 90 disposed in slot 102 and pin 96 disposed in its slot (not shown), both also by biasing assembly 100 of latch mechanism 74, help secure display stand 10 in the reclined position where both support arm 36 and display mounts 22 and 24 are substantially parallel to base 14. Any attempt to extend support arm 36 by rotating it about lower axis 16 is prevented by engagement of side 114 of pin 98 with lip 116 of slot 112. Similarly, any attempt to extend display mount 24 or display 12 by rotating it about upper axis 20 is prevented by engagement of side 118 of pin 92 with lip 120 of slot 104. Although not shown in FIG. 4, a side of pin 96 engages with a lip of the slot in lower hinge 18 to further help prevent extension of support arm 36 by rotating it about lower axis 16. Additionally, although not shown in FIG. 4, a side of pin 90 engages with a lip of slot 102 to further help prevent extension of display mount 22 or display 12 by rotating it about upper axis 22.

There are several advantages to securing display stand 10 in the reclined position in accordance with the present invention where both support arm 36 and display mounts 22 and 24 are substantially parallel to base 14. For example, one advantage is that is allows display 12 to be shipped attached to display stand 10 (as shown in FIG. 4) without the need for a strap or other securing means around them which later needs to be removed and discarded by an end user. This saves cost and time, both during the initial shipment as well as any subsequent shipments. Another advantage is that, should the need arise, it allows display 12 to be serviced in a stable position without the need to remove it from display stand 10. A further exemplary advantage is that display 12 can be manually carried without the display stand 10 extending, possibly damaging it or display 12.

Figure 5:
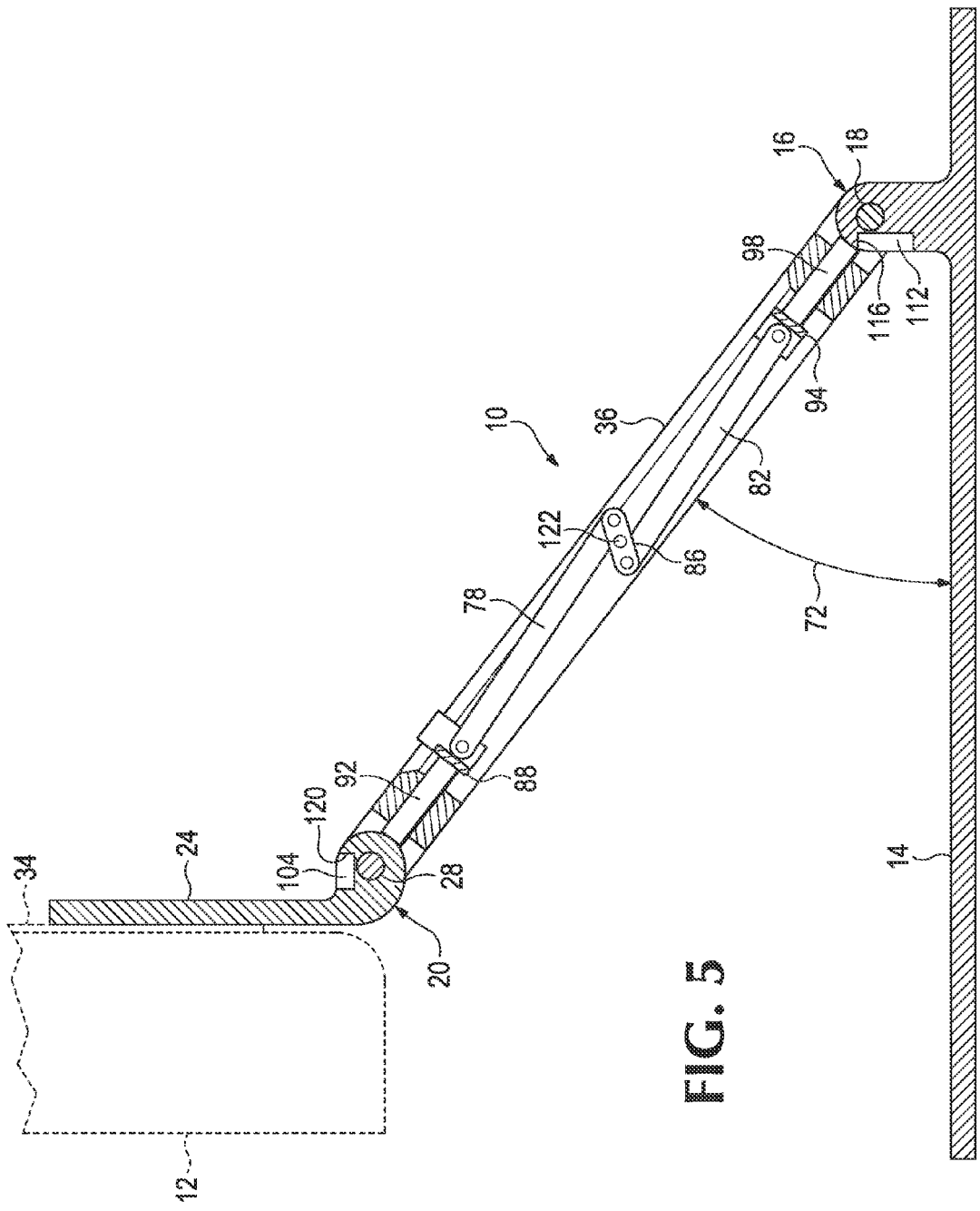
FIG. 5 is a sectional view taken along line 5-5 of FIG. 2.

FIG. 5 is a sectional view of display stand 10 taken along line 5-5 of FIG. 2. An outline of display 12 has been added for illustration. As can be seen in FIG. 5, pin 92 has been removed from slot 104 of upper axis 20, by opposing the force applied by biasing assembly 100 of latch mechanism 74, and display mount 24 extended. Similarly, pin 98 has been removed from slot 112 of lower axis 16, also by opposing the force applied biasing assembly 100 of latch mechanism 74, and support arm 36 extended along angle 72. Additionally, pin 90 has been removed from slot 102 and pin 96 has been removed from its slot (not shown), both also by opposing the force applied by biasing assembly 100 of latch mechanism 74.

Pins 90, 92, 96, and 98 may be removed from their slots (as described above) as follows. First, button 110 of actuator assembly is manually pressed toward upper linkage bar 88 with a force that opposes that applied by biasing assembly 100. This causes upper linkage bar 88 to move toward lower linkage bar 94 and removes pins 90 and 92 from respective slots 102 and 104. This movement of upper linkage bar 88 pushes upper linkages 76 and 78 toward lower linkage bar 94. As linkages 76 and 78 are thus pushed, linkage rocker 86 rotates about its axis 122 and linkage rocker 84 rotates about its axis (not shown). This rotation pulls lower linkages 80 and 82, as well as lower linkage bar 94 to which they are attached, toward upper linkage bar 88. This removes pin 98 from slot 112 and pin 96 from its slot (not shown).

An example of a biasing assembly 100 and portion of support arm 36 are shown in FIG. 6. As can be seen in FIG. 6, this embodiment of biasing assembly 100 includes a resilient member in the form of a substantially uncompressed spring 124 disposed in cavity 126 of support arm 36 that is coupled to upper linkage bar 88 via tab 106. Manual actuation of actuator assembly 108 via button 110 provides an opposing force against biasing assembly 100 that compresses spring 124 as shown in FIG. 7. This removes pins 90, 92, 96, and 98 from their respective slots allowing movement and extension of support arm 36 and display mounts 22 and 24, as described above.

Another example of an alternative biasing assembly 128 and a portion of support arm 36 for display stand 10 is shown in FIG. 8. As can be seen in FIG. 8, this embodiment of biasing assembly 128 includes an uncompressed torsion spring 130 disposed in cavity 132 of support arm 36 around axis 122 and coupled to linkage rocker 86. Manual actuation of actuator assembly 108 via button 110 provides an opposing force against biasing assembly 128 that compresses torsion spring 130. This removes pins 90, 92, 96, and 98 from their respective slots allowing movement and extension of support arm 36 and display mounts 22 and 24, as described above.

Figure 9:
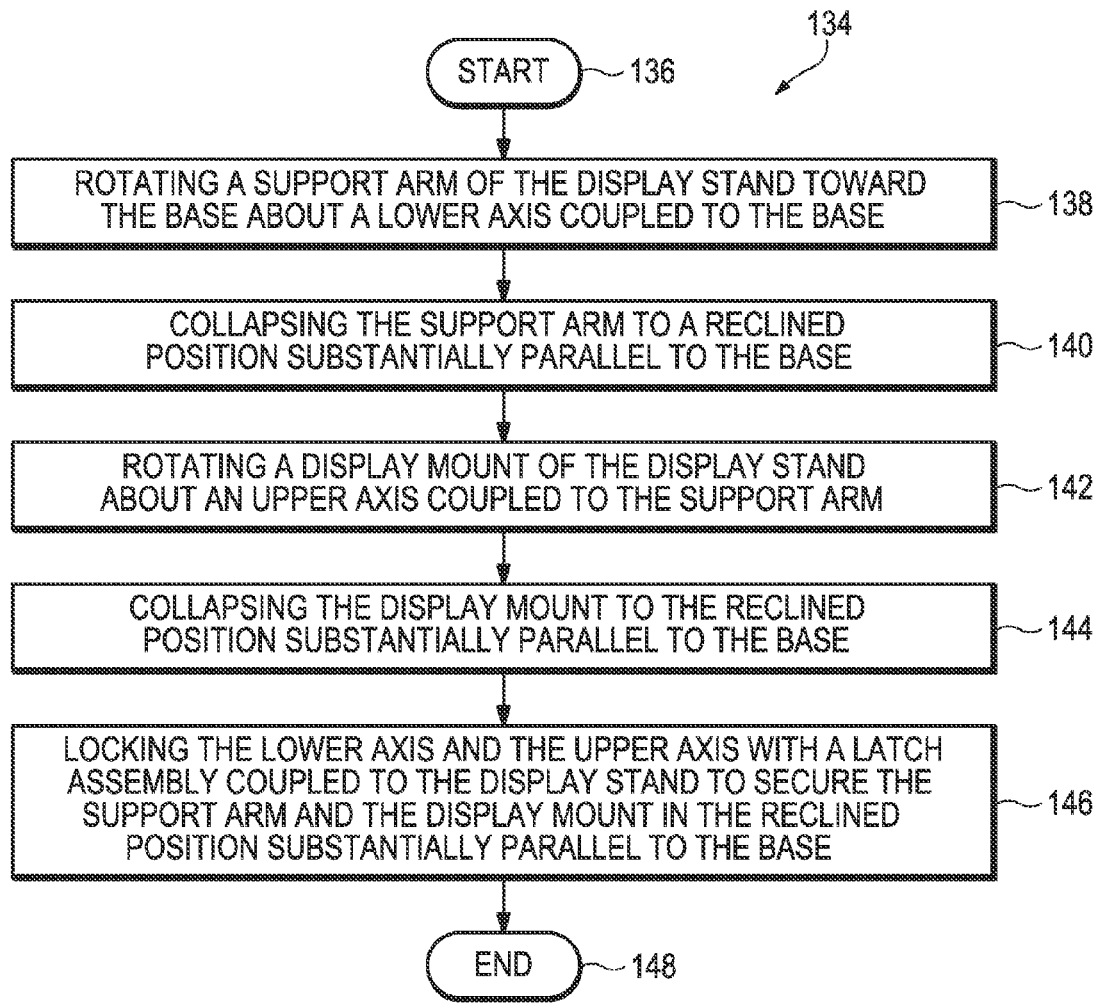
FIG. 9 is an example of a method for a display stand.

An example of a method 134 for a display stand having abuse is shown in FIG. 9. As shown in FIG. 9, method 134 starts 136 by rotating a support arm of the display stand toward the base about a lower axis coupled to the base, as generally illustrated by block 138, and collapsing the support arm to a reclined position substantially parallel to the base, as generally illustrated by block 140. Method 134 next rotates a display mount of the display stand about an upper axis coupled to the support arm, as generally shown by block 142, and collapses the display mount to the reclined position substantially parallel to the base, as generally shown by block 144. As also shown in FIG. 9, method 134 then locks the lower axis and the upper axis with a latch assembly coupled to the display stand to secure the support arm and the display mount in the reclined position substantially parallel to the base, as generally illustrated by block 146. Method 134 may then end 148. Locking the lower axis and the upper axis may include disposing pins in slots formed in the lower axis and the upper axis.

Figure 10:
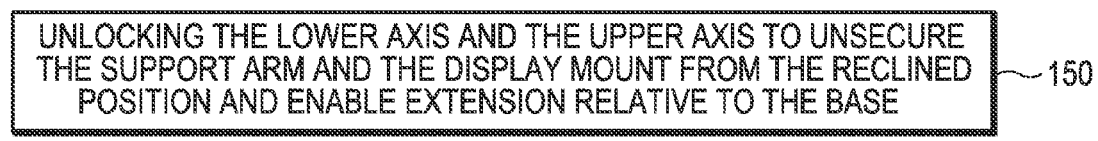
FIG. 10 is an example of an additional element of the method shown in FIG. 9.

As shown in FIG. 10, method 134 may include additional elements to those illustrated in FIG. 9. For example, method 134 may further include unlocking the lower axis and the upper axis to unsecure the support arm and the display mount from the reclined position and enable extension relative to the base, as generally shown by block 150 in FIG. 10. Unlocking the lower axis and the upper axis may include opposing a resilient force applied by a biasing assembly to remove pins disposed in slots formed in the lower axis and the upper axis.

Although several examples have been described and illustrated in detail, it is to be clearly understood that the same are intended by way of illustration and example only. These examples are not intended to be exhaustive or to limit the invention to the precise form or to the exemplary embodiments disclosed. Modifications and variations may well be apparent to those of ordinary skill in the art. For example, although upper axis 20 has been illustrated as including two upper hinges 26 and 28, in other embodiments of the present invention, upper axis 20 may include only a single hinge. As another example, although two display mounts 22 and 24 have been shown, in other embodiments of the present invention, a single display mount configured to attach to display 12 may be used. As a further example, in other embodiments of the present invention, latch mechanism 74 may include a single upper linkage, lower linkage, and linkage rocker. The spirit and scope of the present invention are to be limited only by the terms of the following claims.

Additionally, reference to an element in the singular is not intended to mean one and only one, unless explicitly so stated, but rather means one or more. Moreover, no element or component is intended to be dedicated to the public regardless of whether the element or component is explicitly recited in the following claims.

What is claimed is:

1. A stand for a display, comprising:
   a base;
   a lower axis coupled to the base, the lower axis including a lower slot;
   an upper axis, the upper axis including an upper slot;
   a display mount coupled to the upper axis, the display mount to attach to the display;
   a support arm rotatably coupled to the lower axis and the upper axis, the support arm to retain the display mount in substantially the same orientation relative to the base as an angle of the support arm relative to the base changes; and
   a latch mechanism coupled to the lower axis and the upper axis, the latch mechanism including:
   an upper linkage,
   an upper linkage bar coupled to the upper linkage,
   an upper pin protruding an area proximal to an end of the upper linkage bar,
   a lower linkage,
   a lower linkage bar coupled to the lower linkage,
   a lower pin protruding an area proximal to an end of the lower linkage bar, and
   a linkage rocker coupled to the upper linkage and the lower linkage;
   wherein in a latched position, the lower pin to engage the lower slot and the upper pin to engage the upper slot to prevent rotation of the upper axis and the lower axis and retain the support arm in a reclined position substantially parallel to the base, and in an unlatched position, the lower pin to disengage the lower slot and the upper pin to disengage the upper slot and permit rotation of the support arm and adjustment of the angle of the support arm relative to the base.

2. The stand for a display of claim 1, wherein a height of the display relative to the base increases as the angle of the support arm relative to the base increases.

3. The stand for a display of claim 1, wherein the latch mechanism includes a reverse motion linkage assembly.

4. The stand for a display of claim 1, wherein the latch mechanism is configured to include an upper linkage bar coupled to an upper linkage, a lower linkage bar coupled to a lower linkage, and a linkage rocker coupled to the upper linkage and the lower linkage.

5. The stand for a display of claim 1, wherein the lower axis and upper axis are each configured to include a recess and the latch mechanism is further configured to include a lower pin disposed in the lower axis recess in the latched position and an upper pin disposed in the upper axis recess in the latched position.

6. The stand for a display of claim 1, wherein the latch mechanism is further configured to lock the lower axis and the upper axis in the latched position restricting movement of the support arm relative to the base.

7. The stand for a display of claim 6, wherein the latch mechanism is further configured to unlock lower axis and the upper axis in the unlatched position permitting movement of the support arm through the angle relative to the base.

8. The stand for a display of claim 1, wherein a height of the display mount relative to the base is selected to range from zero (0) millimeters to one hundred (100) millimeters as the angle of the support arm relative to the base increases from the reclined position to an extended position.

9. The stand for a display of claim 1, further comprising a display coupled to the display mount.

10. The stand for a display of claim 9, wherein the display includes one of a peripheral, monitor, a workstation and a computer.

11. A latch mechanism for securing a display stand in a reclined position, the display stand comprising an upper hinge including a slot and a lower hinge including a slot, the latch mechanism comprising:
    a linkage assembly comprising:
    an upper linkage bar,
    an upper pin extending from the upper linkage bar,
    an upper linkage connected to the upper linkage bar,
    a lower linkage bar,
    a lower pin extending from the lower linkage bar,
    a lower linkage connected to the lower linkage bar, and
    a linkage rocker connecting the upper linkage and the lower linkage;
    a biasing assembly connected to the linkage assembly, the biasing assembly to apply a resilient force to the linkage assembly that retains the upper pin in the slot of the upper hinge and the lower pin in the slot of the lower hinge to secure the display stand in the reclined position; and
    an actuator assembly coupled to the upper linkage bar, wherein upon actuation, the actuator to oppose the resilient force applied by the biasing assembly to remove the upper pin from the slot of the upper hinge and the lower pin from the slot of the lower hinge and to unsecure the display stand from the reclined position.

12. The latch mechanism of claim 11, wherein the actuator assembly includes a manually actuated button.

13. The latch mechanism of claim 11, wherein the biasing assembly is coupled to one of the upper linkage bar and the linkage rocker.

14. The latch mechanism of claim 11, wherein the biasing assembly includes a spring.

15. A method for a display stand having a base, comprising:
    rotating a support arm of the display stand toward the base about a lower axis coupled to the base until the support arm is in a reclined position substantially parallel to the base, the support arm including a lower linkage, a lower linkage bar coupled to the lower linkage, a lower pin protruding from an area proximal an end of the lower linkage bar, an upper linkage coupled to the lower linkage by a rocker, an upper linkage bar coupled to the upper linkage, and an upper pin protruding from an area proximal an end of the upper linkage bar;

rotating a display mount of the display stand about an upper axis coupled to the support arm until the display mount is in the reclined position substantially parallel to the base; and locking the lower axis and the upper axis by engaging the lower pin and the upper pin, with a slot in the lower axis and a slot in the upper axis respectively to prevent rotation of the upper axis and rotation of the lower axis and secure the support arm and the display mount in the reclined position substantially parallel to the base.

16. The method of claim 15, further comprising unlocking the lower axis and the upper axis to unsecure the support arm and the display mount from the reclined position and enable extension relative to the base.

17. The method of claim 16, wherein unlocking the lower axis and the upper axis includes opposing a resilient force applied by a biasing assembly to remove pins disposed in slots formed in the lower axis and the upper axis.

18. The method of claim 15, wherein locking the lower axis and the upper axis includes disposing pins in slots formed in the lower axis and the upper axis.

* * * * *